United States Patent Office 3,306,866
Patented Feb. 28, 1967

3,306,866
STABLE EMULSION OF COPOLYMERIZED ALKYD RESINS AND ADDITION POLYMERIZABLE MONOMERS
Douglas F. Percival, Martinez, Wolfgang K. Seifert, Berkeley, and Arne H. Traaen, Oakland, Calif., assignors to Chevron Research Company, a corporation of Delaware
No Drawing. Filed Sept. 21, 1962, Ser. No. 225,359
4 Claims. (Cl. 260—22)

This invention relates to the preparation of stable emulsions of copolymerized alkyd resins and addition polymerizable monomers.

The use of alkyd resins in emulsions to be used as paints is well known in the art. Various modifications of alkyd resins are reported which provide products with improved properties. Often an alkyd resin is modified with an oil to introduce long-chain, unsaturated fatty acids into the alkyd resin. The sites of unsaturation aid in the drying of the resin to a hard, durable film. The unsaturation also provides sites for modification with addition polymers. Various addition polymers have been used to improve the properties of the alkyd resin. See, for example, U.S. Patents Nos. 2,495,458, 2,919,253, and 2,926,151.

Modification of the alkyd resin with an addition polymer greatly enhances the resin's usefulness, for example, by decreasing the drying time, increasing hardness, improving chemical resistance, etc. However, it is frequently difficult to prepare an addition polymer-modified, oil-modified alkyd resin of high viscosity which will form a stable oil-in-water emulsion. Various additives have been used to increase the stability of the emulsion, such as starch, ammonium caseinate, dextrin or gelatin, but these additives usually detract from the desired physical properties of the film which is obtained when the emulsion is spread or sprayed. Increasing the ratio of water to oil helps in stabilizing the emulsion, but results in a poor product, requiring large undesirable volumes of the emulsion to obtain satisfactory films, as well as introducing other disadvantages.

In modifying the alkyd resin in solution, the prior art has shown that the addition polymer may be introduced into the alkyd resin a variety of ways. The formed addition polymer may be bonded to the unsaturated fatty acid before the fatty acid is introduced into the alkyd resin. Another way is to copolymerize the monomer with the fatty acid ester prior to incorporation in the alkyd resin. A third way is to have the vinyl monomer polymerized in the presence of the oil-modified alkyd resin. The co-polymerization with the oil-modified alkyd resin is preferred.

Merely mixing an alkyd resin, water, an addition polymerizable olefin and a free redical catalyst and carrying out the polymerization is unsatisfactory. The rates are usually prohibitively low unless gross amounts of catalyst are introduced. Extensive hydrolysis of the alkyd resin occurs during the polymerization, seriously reducing the viscosity of the resin. Moreover, the particle size becomes so large that it is impossible to obtain a stable oil-in-water emulsion.

It has now been found that stable oil-in-water emulsions of an addition polymer-modified, oil-modified alkyd resin may be prepared by:

(1) Solution polymerization with an oil-soluble catalyst of an addition polymerizable monomer in the presence of an oil-modified alkyd resin having ethylenic unsaturation until about 40 to 70% of the monomer has polymerized;

(2) Adding water, an emulsifying agent, and a pH control agent to form a water-in-oil emulsion, while maintaining the reaction temperature;

(3) Continuing polymerization until about 60 to 85% of said monomer has reacted;

(4) Inverting to an oil-in-water emulsion;

(5) Continuing the polymerization at the same or slightly elongated temperature at which the inversion occurred, until the desired amount of said monomer has reacted.

By carrying out the addition polymerization modification according to the above steps, the rate of formation is enhanced, hydrolysis of the alkyd resin is minimized, and an emulsion is directly obtained which is suitable to be used as a paint base.

The first step of the process of this invention is the polymerization of an addition polymerizable monomer in the presence of an ethylenically unsaturated alkyd resin until at least 40%, preferably 50%, of the addition polymerizable monomer has been polymerized. The components of the first step of this process are, therefore, the addition polymerizable monomer, the oil-soluble catalyst, and the ethylenically unsaturated alkyd resin.

Alkyd resins, including drying and semi-drying resins, are well known in the art. Numerous examples of such resins and the materials used for their formation may be found in Organic Coating Technology, volume 1 (1954), by H. F. Payne, in chapters 7 and 8. The polybasic acids which are used in the formation of alkyd resins may be varied widely. Such aliphatic and aromatic polycarboxylic acids as oxalic, malonic, succinic, adipic, sulferic, phthalic, isophthalic, terephthalic, 3,4-benzphthalic, maleic, fumaric, tricarballylic, citric, and tartaric are illustrative of the acids which fine common use. Preferred acids are those polybasic acids of not more than 12 carbons and particularly preferred are the aromatic dibasic acids of not more than 12 carbons, that is, of from 8 to 12 carbons, e.g., the phthalic acids and lower alkyl substituted phthalic acids.

The polyols which find use in alkyd resins may also be varied over a wide range. They are usually of from 3 to 10 carbons and have at least 3 hydroxyl groups. Illustrative of alcohols commonly used are glycerin, pentaerythritol, trimethylolpropane, trimethylolethane, dipentaerythritol, etc.

The oils used to modify the alkyd resin to incorporate unsaturation are also well known. Typically may be mentioned soya oil, dehydrated castor oil, tung oil, linseed oil, tall oil, palm oil, rapeseed oil, certain animal or fish oils, such as whale oil, menhaden oil, sardine oil, etc. Besides these oils, glycerides or other esters of unsaturated fatty acids, such as linoleic acid, linolenic acid, etc., may be used. All these oils as well as their substitutes are well known in the art to be used for the introduction of unsaturation into the alkyd resin. Of course, if one uses unsaturated polybasic acids, such as maleic, fumaric, itaconic, pent-2-en-1,5-dioic acid, etc., or unsaturated polyols, it may not be necessary to introduce further unsaturation into the alkyd resin by means of oils or fatty acid esters having unsaturation.

As already indicated, the materials used in forming the alkyd resins to be used in this invention are not critical and great variation is permitted. It is necessary, however, that the alkyd resins used have certain physical properties. It is preferred that they have an oil length of from about 40 to 80%, and preferably, in the range of 60 to 70%. By oil length is intended the percent of oil in the alkyd resin, the theoretical water having been subtracted. The acid number may vary from about 5 to about 25, but preferably should be in the range of about 10 to 20, and the range 15 to 20 is particularly preferred. Finally, the viscosity measured as 66.6% total solid in xylene at 77° C. (Gardner-Holdt measurement) can vary from A to X, but is preferably in the range of K to T or U. Subject to the above limitations, the particular components of the alkyd resin are not critical to the successful carrying out of the process of this invention.

The addition polymerizable monomer used to modify the alkyd resin is a free-radical addition polymerizable olefinic compound, i.e.,

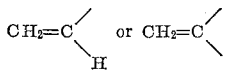

The monomers are for the most part terminal olefins which are conjugated with a group or atom having free electrons. The group having the free electrons may be benzenoid as in such compounds as styrene, para-chlorostyrene, metamethylstyrene, α-vinylnaphthalene, α-methylstyrene, etc. The monomer may be an olefin conjugated with a carbonyl group as in methyl acrylate, butyl acrylate, ethyl α-methylacrylate, methyl vinyl ketone, etc. Or, the double bond may be conjugated with an atom having free electrons as in such compounds as methyl vinyl ether, vinyl acetate, vinyl benzoate, n-vinylpyrrolidone, vinyl methyl sulfoxide, etc. The preferred monomers are derivatives of styrene, particularly hydrocarbon, having not more than 12 carbons and the derivatives of acrylic and methacrylic acid, of not more than 8 carbons, such as esters, amides, etc.

The amount of monomer used in weight relation to the amount of alkyd resin present will vary depending upon the particular monomer. It will customarily be in the range of a weight ratio of about 3:1 to about 1:2 in parts of alkyd resin to parts of addition monomer, preferably 2:1 to 1:1.

Any of the common oil-soluble, free-radical catalysts may be used in the polymerization. The common peroxidic or azo catalysts are operative and are chosen according to the temperature at which the polymerization is to be carried out. Such catalysts as benzoyl peroxide, 2,4-dichlorobenzoyl peroxide, lauroyl peroxide, t-butyl hydroperoxide, t-butyl peroxide, cumene hydroperoxide, etc., may be used. Among azo catalysts, azo bis-isobutyronitrile, azo bis-isovaleronitrile, etc., are illustrative. Activators such as cobalt, manganese, etc., may be used if desired. The amount of catalyst will usually be from 1 to 10% by weight of the monomer and preferably from 3 to 8% by weight. The addition of the catalyst may be in bulk, all of the catalyst added initially, or portion-wise during the first stage of the reaction.

The choice of temperature and catalyst are interdependent. The rates of decomposition or initiation of the various free-radical catalysts are well known and may be chosen to give the desired rate at the temperature at which the polymerization is carried out. Typically, the polymerization will be carried out at a temperature in excess of 50 °C., usually in the range of 60 to 95° C. and preferably in the range of 70 to 90° C. However, with catalysts having decomposition rates at temperatures below 50° C. and which will efficiently initiate the polymerization, temperatures below 50° C. may be used.

An inert solvent may be used, but it is preferred to have the monomer as a solvent. Usually any advantages obtained by using a solvent, such as better control of polymerization rate, temperature, etc., are offset by disadvantages in the final product, such as increasing difficulty in obtaining a stable emulsion, bad odor, slow drying rate, etc. Such solvents as toluene, xylene, etc. are illustrative of solvents which find use in this invention.

As already indicated, the polymerization should be carried out in the first stage until at least about 40% of the monomer present is polymerized, preferably about 50%.

After about 40% or more of the monomer has polymerized, the second stage of the process of this invention is begun. At this time, water, an emulsifying agent, and a pH control agent are added, while the temperature is usually maintained or varied only slightly. Whether the organic phase is added to the aqueous phase with stirring, or vice versa, does not adversely affect the process and either method of addition can be used.

The amount of water added can be varied widely. However, the desirable emulsions have a minimum amount of water. Oil-in-water emulsions having large amounts of water are relatively stable and readily obtained. By contrast, as the amount of water is decreased, the attainment of a stable emulsion becomes exceedingly more difficult. In this invention, the amount of water can be as little as 25% by weight of combined water, monomer and alkyd resin but will usually be 30% by weight or more. For a practical paint, it will not exceed about 70% by weight and, usually, will not exceed 50%. However, the amount of water above 50% is not critical to this invention, but is merely a matter of expediency and practicality.

Various emulsifying agents can be used in this invention which are nonionic. Illustrative of nonionic emulsifying agents are alkylphenyl ethers of polyethylene glycol, polyalkanol amides, esters of polyethylene glycol, fatty alkylol amides, etc. Various of these emulsifying agents are found in "Surfactants Listed," J. W. McCutcheon, "Soap and Chemical Specialities," December 1957, January, February, March, April 1958.

The choice of the particular emulsifier will depend on the hydrophilic/lyophilic balance (HLB). An excellent discussion of HLB is found in U.S. Patent No. 2,978,346 and the references cited therein. In general, the HLB will vary between about 5 and 25. The HLB desired will depend upon the particular free-radical addition polymerizable monomer used. The more heteroatoms present in the monomer, the lower will be the permissible HLB of the emulsifier. For hydrocarbon monomers, the HLB will be about 13 to 17.

It is desirable in preparing the emulsions of this invention to use a minimum amount of emulsifier. The amount of emulsifier will customarily be in the range of 1 to 10% by weight based on water present, but because of the deleterious effect of the emulsifier on the films obtained from the emulsion, it is preferred that the amount of emulsifier not exceed 7%. The preferred amount of emulsifier will usually be in the range of about 2 to 6 weight percent based on the weight of water.

The pH control agent is a hydroxylic base. The preferred bases are those containing alkali metal cations and ammonium cations, e.g., lithium hydroxide, sodium hydroxide, potassium hydroxide, ammonium hydroxide, etc. Particularly preferred is lithium hydroxide. The amount of base added will be sufficient to obtain a pH in the range of about 6 to 8, and preferably of about 6.5 to 7. In obtaining this pH, about 15 to 100% of the carboxyl groups will be neutralized and preferably about 40 to 70%.

The amount of emulsifier, its HLB, the amount of hydroxylic base and the pH obtained by its addition significantly affect the inversion and the size of the particles. By controlling the amounts of the materials so that the resulting conditions are within the limit specified in this invention, the subsequent inversion is readily achieved and a stable emulsion is obtained. The amounts of emulsifier and hydroxylic base also affect the conditions under which the invention occurs.

The temperature for the second phase of this process is maintained at about the same temperature as the first phase. Since the polymerization of the monomer is continued through this phase, the temperature in the first phase which gave a reasonable rate of polymerization will also suffice for this phase. The polymerization is continued until about 60 to 85% of the free-radical addition polymerizable monomer has reacted. By maximizing the amounnt of monomer polymerized up to 85%, prior to the inversion to an oil-in-water emulsion, small particles are obtained which aid in the stability of the emulsion.

Once the desired percentage of the monomer has reacted, the temperature is customarily lowered until the water-in-oil emulsion which was formed in the previous stage of the process inverts to an oil-in-water emulsion. If the materials have been added in proper amounts, the inversion will occur. This change is readily evident and most frequently requires a reduction in temperature of at least about 5° C. and sometimes 10° C. or more. The temperature drop necessary will be dependent upon the materials present and their amounts. In some instances, with large amounts of emulsifier present, an increase in temperature is required to obtain an inversion to oil-in-water.

Once the inversion has been achieved, the temperature may be maintained or raised slightly, taking care that the oil-in-water emulsion does not invert back to the water-in-oil emulsion. The polymerization is then continued until the desired amount of monomer has polymerized usually at least about 70%. Preferably, the final product will contain as polymer about 75 to 98% of the monomer originally introduced.

The process is readily carried out at atmospheric pressure. However, the process may be carried out, if desired, at super- or subatmospheric pressures. Mild agitation is used throughout the process. While rapid agitation would result in somewhat smaller particles in the emulsion, high speeds are not necessary as the size of the droplets obtained are of less than about 3 microns. This size droplet has found commercial acceptance in emulsions to be used as paints.

Various stabilizers may be added if desired. Stabilizers such as starch, gelatin, etc. can be used but are not preferred. The stabilizer is added after the oil-in-water emulsion has been obtained. Driers, while not necessary, can also be added to the emulsion. Examples of driers which find use are naphthanates of cobalt, manganese, etc.

As already indicated, a wide variety of compositions of the oil phases of the emulsions are permitted in this invention. The following compositions are illustrative of compositions which find use in the process of this invention:

An alkyd resin of succinic acid and glycerol, modified with the glyceride of linoleic acid and then by a polymer of ethyl acrylate; an alkyd resin of terephthalic acid and trimethylol propane modified with tung oil and further modified with a polymer of vinyl benzyl ether; an alkyd resin of glutaric acid with a small amount of maleic acid and trimethylol propane, modified with a mixture of soya oil and dehydrated castor oil and further modified with a polymer of vinyl benzoate; an alkyd resin of suberic acid and pentaerythritol modified with tung oil and further modified with a polymer of para-chlorostyrene and divinyl benzene; an alkyd resin formed from phthalic anhydride and glycerol, modified by a mixture of soya fatty acids and dehydrated castor oil and further modified by a polymer of butyl α-methylacrylate; an alkyd resin of phthalic acid and a small amount of fumaric acid and trimethylol ethane, modified with a polymer of para-methylstyrene.

The alkyd resins obtained in this invention have a weight ratio of vinyl polymer to alkyd resin in the final product of about 2:3 to 3:2. While relatively wide variation is permitted in this ratio, it is preferred that there be at least 40 weight percent of alkyd resin in the final product, the preferred range being about 50 to 70% by weight.

To further illustrate the process of this invention, the following examples are given. They are not to be construed as limitations upon its scope.

*Example I.—Preparation of alkyd resin*

Into a reaction vessel was introduced 18,008 g. of linseed oil, 948 g. of tung oil (oil length—66.5), and 15.8 g. of litharge and warmed up to 480° F. Thereafter 1,474 g. of pentaerythritol was added and the temperature brought back to 480° F., during 14 minutes, at which time 2,949 g. of pentaerythritol was added and the mixture heated for 1.5 hours at about 480° F. The temperature was then dropped to 375° F. and 6,634 g. of isophthalic acid added. The temperature was raised to 460° F., during 3.0 hours, and maintained for about 0.75 hour, so that the product has an acid number of 18, a Gardner-Holdt viscosity of Q at 66.6% solids in xylene.

*Example II.—Preparation of alkyd resin*

The resin was prepared according to Example I, except that the reaction was continued until the resin had an acid number of 16.0.

*Example III.—Preparation of alkyd resin*

Into a reaction vessel was introduced 1,689 g. of soya oil, 561 g. of dehydrated castor oil and 2.1 g. of lithium ricinoleate. The mixture was heated to 480° F. and 297 g. of pentaerythritol added. After heating for about 1½ hours, in which time alcoholysis was complete, the mixture was cooled to 400° F. and 558 g. of isophthalic acid added. The temperature was then raised to 460 to 470° F. and maintained for 4.3 hours, until the acid number was 12.3. The alkyd resin had a Gardner-Holdt viscosity of B— at 66.6% solids in xylene and an oil length of 75%.

*Example IV.—Styrenation of the alkyd resin of Example I*

To 55 parts of the alkyd resin prepared in Example I was added 45 parts of styrene and 2.7 parts of benzoyl peroxide and the mixture heated to 80° C. After a period of 1 hour and 45 minutes, approximately 55% of the monomer had been consumed. To this partially polymerized mixture was added 100 parts of water, 4 parts of a mixture of Igepal CO 880[1] and Igepal CO 430[1] in a ratio of 3.19 to 0.81 having an HLB number 15.5 and 0.28 part of lithium hydroxide. The addition occurred over a period of 20 to 30 seconds while the temperature was maintained at about 80° C. The emulsion was then stirred for about 2.25 hours until about 75% of the monomer had been consumed. The mixture was cooled to 60° C., at which time inversion occurred. The temperature was then raised to 70° C. and the polymerization continued for 60 minutes, at which time 80% of the styrene monomer had been consumed. The temperature was then dropped to room temperature yielding a stable oil-in-water emulsion, having an alkyd-styrene ratio of 60/40, a pH of 6.5 and 48.3 weight percent water.

*Example V.—Styrenation of alkyd resin of Example III*

To 50 parts of the alkyd resin prepared in Example III was added 50 parts of styrene and, portionwise, 2.5 parts of benzoyl peroxide and the mixture heated to 80° C. After a period of 2 hours and 15 minutes, 100 parts of water, 6 parts of a mixture of Igepal CO 880 and Igepal CO 430 in a ratio of 4.0 to 2.0 having an HLB number 14.4, and 0.273 part of lithium hydroxide (103% neutralization of free acid groups in the alkyd) was added.

The emulsion was then stirred for about 2 hours until about 85% of the monomer had been consumed. The mixture inverted right before this point to an oil in water. The temperature was then dropped to room temperature yielding a stable oil in water emulsion having an alkyd/styrene ratio of 54/46, a pH of 8.5, and 48.0 weight percent water.

*Example VI.—Para-vinyl toluene modification of alkyd resin prepared in Example I*

Into a reaction vessel was introduced 55 parts of alkyd resin prepared in Example I, 45 parts of paravinyl toluene and 2.7 parts of benzoyl peroxide and heated at about 80° C. for 1 hour and 45 minutes. Approximately 50% of the para-vinyl toluene monomer had been consumed, at which time 100 g. of water, 3.19 g. of Igepal 880, ---
[1] Nonyl phenoxy polyoxyethylene ethanols.

0.81 g. of Igepal 430 (HLB 15.5), and 0.28 g. of lithium hydroxide were added over a period of 20 to 30 seconds with stirring. A water-in-oil emulsion formed. The temperature was maintained for a further period of 4.25 hours, at which time about 74% of the monomer had reacted. The temperature was then lowered to about 65° C., causing an inversion to an oil-in-water emulsion. The temperature was then raised to 68° and polymerization continued for 70 minutes. The product was then cooled to room temperature yielding a stable oil-in-water emulsion, having an alkyd/p-vinyl toluene ratio of 62/38, a pH of 6.5 and 48.3 weight percent water.

curred, the water-in-oil emulsion going into an oil-in-water emulsion. The temperature was then lowered to 70° C. and the polymerization continued until about 80% of the monomer had been consumed. The product was then cooled down to room temperature yielding a stable oil-in-water emulsion, having an alkyd/methyl methacrylate ratio of 61/39, a pH of 6.6 and 48.3% water by weight.

The following table exemplifies a number of emulsions prepared in the manner described in Example IV.

TABLE I

| Alkyd Resin Ex. | Parts Alkyd | Parts Styrene | Parts $H_2O$ | Parts Emulsifier Igepal[1] | | HLB | Parts LiOH | Parts Catalyst | | Percent Styrene Polymerized Final | Time, Min. | | | Final pH | Portionwise Addition of Cat[4] | Temp., °F. | |
|---|---|---|---|---|---|---|---|---|---|---|---|---|---|---|---|---|---|
| | | | | 880 | 430 | | | BPO[2] | AIBN[3] | | 1st | 2nd | Final | | | 1st Stage | Inversion |
| I | 50 | 50 | 100 | 4.0 | 2.0 | 14.4 | 0.21 | 2.5 | | 78 | 122 | 90 | 150 | 6.0 | √ | 176 | 153 |
| I | 70 | 30 | 100 | 2.92 | 1.08 | 15.0 | 0.30 | 2.4 | | 76 | 125 | 220 | | 6.3 | √ | 176 | 144 |
| I | 55 | 45 | 100 | 3.19 | 0.81 | 15.5 | 0.25 | 2.7 | | 76 | 90 | 105 | 110 | | | 176 | 160 |
| I | 55 | 45 | 100 | 3.43 | 0.57 | 16.0 | 0.25 | 2.7 | | 74 | 91 | 105 | 100 | | | 176 | 150 |
| I | 55 | 45 | 100 | 4.0 | | 17.2 | 0.25 | 2.7 | | 75 | 90 | 115 | 80 | | | 176 | 152 |
| I | 55 | 45 | 100 | 2.92 | 1.08 | 15.0 | [5]0.22 | 2.7 | | 80 | 150 | 100 | 10 | 6.7 | | 170 | 158 |
| I | 50 | 50 | 100 | 6.66 | 0.66 | 16.6 | 0.16 | | 3.75 | 90 | | | 300 | 6.3 | | | 183 |
| I | 60 | 40 | 100 | 5.33 | 2.66 | 14.4 | 0.23 | | 3.76 | 89 | 160 | | 375 | 6.0 | √ | 176 | 156 |
| I | 40 | 60 | 100 | 4.0 | 2.0 | 14.4 | 0.17 | 3.0 | | 76 | 136 | | 230 | 6.0 | √ | 176 | 168 |

[1] Nonyl phenoxy polyoxyethylene ethanols.
[2] Benzoyl peroxide.
[3] Azo-bis-isobutyronitrile.
[4] Description of portionwise addition.
[5] Parts $NH_3$ rather than LiOH.

The following table illustrates the preparation of emulsions with varying ratios of resin to water.

TABLE II

| Alkyd Resin Ex. | Parts Alkyd | Parts Styrene | Parts BPO | Parts Emulsifier Igepal | | Percent of free acid neutralized with LiOH | Emulsion Viscosity | Percent solid in Emulsion |
|---|---|---|---|---|---|---|---|---|
| | | | | 880 | 430 | | | |
| I | 55 | 45 | 2.7 | 3.2 | 0.8 | 65 | A₂ | 47 |
| II | 66 | 54 | 3.2 | 4.8 | 1.2 | 65 | E-F | 50 |
| III | 82.5 | 67.5 | 4.1 | 6.0 | 1.5 | 65 | I-J | 55 |

*Example VII.—Modification with methyl methacrylate of alkyd resin prepared in Example I*

Into a reaction vessel was introduced 55 parts of alkyd resin prepared in Example I, 43.3 parts of methyl methacrylate and 2.7 parts of benzoyl peroxide. The temperature was raised to 80° C. and the mixture stirred for 53 minutes. At this time about 50% of the monomer had reacted. To this mixture was then added 98.3 parts of water, 3.2 parts of Igepal 880, 0.8 part of Igepal 430 (HLB 15.5), and 0.28 g. of lithium hydroxide. The temperature was maintained at 80° C. and polymerization continued until about 55% of the monomer had reacted. This required a period of 0.5 hour. The temperature was then lowered to 75° C. and inversion oc- The emulsions obtained by the process of the invention are stable for long periods of time. Emulsions which have been allowed to stand for periods in excess of 90 days had not separated into two phases. Moreover, the oil particles in the emulsion are found to be smaller than 3 microns. The emulsions prepared by the process of this invention have excellent properties for their use as paints. They are fast drying, generally giving clear films and good hardness. The following table illustrates the properties of films obtained from some of the emulsions prepared according to the process of this invention.

Driers were added to the emulsion and the emulsion spread on a flat surface to provide a film of the indicated thickness. The films were tested for dry times, Sward hardness, and gloss. The particle sizes of the particles in the emulsion are also indicated for a few of the emulsions.

TABLE III

| Resin Used Prepared in Ex. | Driers[1] | Dry Times 3-mil Film | | | Sward Hardness After 15 days, Percent | Particle Size of Emulsion, μ |
|---|---|---|---|---|---|---|
| | | ST,* Min. | TF,* Min. | DH,* Hr. | | |
| VI | | 40 | 195 | 24 | 18 | 1.2 |
| | x | 30 | 42 | 6 | 22 | 1.2 |
| VII | | 40 | 45 | 1.5 | 18 | 0.6 |
| | x | 33 | 38 | 0.8 | 20 | 0.6 |

[1] Metal naphthenate containing 0.04% Co and 0.04% Mn based on total solids.
*ST=Set to Touch; TF=Tack Free; DH=Dry Hard.

The results in Table III demonstrate that the emulsions prepared by this invention rapidly set to hard, tack-free film which find a variety of uses as coatings. The low particle size provides stable emulsions over long periods of standing.

As will be evident to those skilled in the art, various modifications of this process can be made or followed, in the light of the foregoing disclosure and discussion, without departing from the spirit or scope of the disclosure or from the scope of the following claims.

We claim:

1. A method of preparing an oil-in-water emulsion of an addition polymer-modified, oil-modified alkyd resin, said addition polymer-modified resin being at least 30% by weight of said emusion, which comprises:
    (a) polymerizing an addition polymerizable monomer containing the group $CH_2=C<$ in the presence of an oil-modified ethylenically unsaturated alkyd resin and an oil-soluble free-radical catalyst until about 40 to 70% of the monomer has polymerized, wherein the weight ratio of said alkyd resin to said monomer is in the range of about 3:1 to 1:2, said alkyd resin having: (i) an acid number in the range of about 5 to 25, (ii) a Gardner-Holdt viscosity in the range of A to X, and (iii) an oil length of about 40 to 80%;
    (b) adding water in an amount of about 25 to 70 weight percent based on combined weight of alkyd resin, monomer and water; an hydroxylic base in an amount sufficient to provide a pH of from about 6 to 8; and a nonionic emulsifying agent in an amount of 1 to 10% by weight based on water present to form a water-in-oil emulsion;
    (c) continuing polymerization until about 60 to 85% of said monomer has reacted;
    (d) lowering the temperature to form an oil-in-water emulsion;
    (e) continuing polymerization until the desired amount of monomer has reacted,
to yield a stable oil-in-water emulsion having particles of not more than about 3 microns in size.

2. A method according to claim 1 wherein said oil-modified alkyd resin is derived from a polybasic aromatic acid, said monomer is a hydrocarbon derivative of styrene of not more than 12 carbons and said hydroxylic base is lithium hydroxide.

3. A method according to claim 1 wherein said alkyd resin has an acid number in the range of about 10 to 20, a Gardner-Holdt viscosity in the range of K to U, and an oil length of from 60 to 70%.

4. A method of preparing an oil-in-water emulsion of a styrene-modified, oil-modified ethylenically unsaturated alkyd resin in which the resin content comprises about 50% by weight of said emulsion, wherein the polybasic acid portion is an aromatic carboxylic acid which comprises:
    (a) polymerizing styrene at an elevated temperature in the presence of said resin and an oil soluble-free radical catalyst until about 50% of said styrene has polymerized, wherein the weight ratio of said alkyd resin to said styrene is in the range of about 2:1 to 1:1, said alkyd resin having: (i) an acid number in the range of 15 to 20, (ii) a Gardner-Holdt viscosity in the range of K to U, and (iii) an oil length of about 60 to 70%;
    (b) adding water in an amount of about 50 weight percent based on total weight of alkyd resin, said styrene and water; and lithium hydroxide in an amount sufficient to provide a pH of from about 6.5 to 7 and a nonionic emulsifying agent in an amount of from 2 to 6% by weight based on water present to form a water-in-oil emulsion;
    (c) continuing polymerization until about 70% of said styrene has reacted;
    (d) lowering the temperature to form an oil-in-water emulsion;
    (e) continuing polymerization until at least 75% of said styrene has reacted,
to yield a stable oil-in-water emulsion having particles of not more than 3 microns in size.

References Cited by the Examiner

UNITED STATES PATENTS

| | | | |
|---|---|---|---|
| 2,719,133 | 9/1955 | Smith | 260—22 |
| 2,941,968 | 6/1960 | McKenna | 260—22 |
| 3,058,932 | 10/1962 | Petty | 260—22 |
| 3,069,380 | 12/1962 | Nozaki | 260—29.6 |

LEON J. BERCOVITZ, *Primary Examiner.*

JOSEPH L. SCHOFER, *Examiner.*

J. A. SEIDLECK, R. W. GRIFFIN, *Assistant Examiners.*